(12) United States Patent
Abe

(10) Patent No.: US 8,213,170 B2
(45) Date of Patent: Jul. 3, 2012

(54) ELECTRONIC APPARATUS

(75) Inventor: Koji Abe, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/087,949

(22) Filed: Apr. 15, 2011

(65) Prior Publication Data

US 2011/0286163 A1 Nov. 24, 2011

(30) Foreign Application Priority Data

May 21, 2010 (JP) ................................. 2010-117738

(51) Int. Cl.
*G06F 1/16* (2006.01)
(52) U.S. Cl. ..................... 361/679.27; 345/207; 606/50; 200/344
(58) Field of Classification Search .................. 439/159, 439/165; 345/168, 173, 177, 156, 207, 690; 341/34; 606/33, 41, 42, 50; 200/5 A, 341, 200/310, 344; 463/39; 235/492; 361/679.01, 361/679.41, 679.57, 679.37, 679.55, 679.09, 361/679.27, 679.56, 679.08, 679.02, 679.21, 361/679.48
See application file for complete search history.

(56) References Cited

U.S. PATENT DOCUMENTS

| | | | |
|---|---|---|---|
| 5,359,792 A | 11/1994 | Hanada | |
| 6,480,375 B2 | 11/2002 | Horikoshi et al. | |
| 6,834,810 B2 | 12/2004 | Maruyama | |
| 6,995,975 B2 | 2/2006 | Hamada et al. | |
| 7,755,884 B2 | 7/2010 | Horiuchi et al. | |
| 2002/0015285 A1 | 2/2002 | Horikoshi et al. | |
| 2002/0195500 A1 | 12/2002 | Maruyama | |
| 2004/0207976 A1* | 10/2004 | Hamada et al. | 361/680 |
| 2008/0232058 A1 | 9/2008 | Horiuchi et al. | |
| 2009/0244820 A1* | 10/2009 | Kusaka et al. | 361/679.1 |
| 2010/0091442 A1* | 4/2010 | Theobald et al. | 361/679.09 |

FOREIGN PATENT DOCUMENTS

| | | |
|---|---|---|
| JP | 02-136175 A2 | 5/1990 |
| JP | 09-062400 A2 | 3/1997 |
| JP | H09-214142 | 8/1997 |
| JP | 2000-323858 | 11/2000 |
| JP | 2001-297572 | 10/2001 |
| JP | 2003-006603 | 1/2003 |
| JP | 2004-272732 | 9/2004 |
| JP | 2008-234100 | 10/2008 |
| JP | 2009-149110 | 7/2009 |
| JP | 2009-238175 | 10/2009 |

OTHER PUBLICATIONS

Notice of Reasons for Rejection mailed by the Japan Patent Office on Jul. 19, 2011 in the corresponding Japanese patent app. No. 2010-117738 in 6 pages.

* cited by examiner

*Primary Examiner* — Hung Duong
(74) *Attorney, Agent, or Firm* — Knobbe, Martens, Olson & Bear LLP

(57) ABSTRACT

According to one embodiment, an electronic apparatus includes a housing including a palmrest, and a honeycomb-shaped rib on an inner surface of the palmrest.

19 Claims, 9 Drawing Sheets

ELECTRONIC APPARATUS

CROSS-REFERENCE TO RELATED APPLICATIONS

This application is based upon and claims the benefit of priority from Japanese Patent Application No. 2010-117738, filed May 21, 2010; the entire contents of which are incorporated herein by reference.

FIELD

Embodiments described herein relate generally to an electronic apparatus including a palmrest.

BACKGROUND

In recent years, the weight and thickness of electronic apparatuses, such as notebook personal computers (hereinafter, referred to as notebook PCs), have been increasingly reduced. Along with the reduction in the weight and thickness, the thickness of a housing of the electronic apparatus has been increasingly reduced.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, an electronic apparatus comprises a housing comprising a palmrest, and a honeycomb-shaped rib on an inner surface of the palmrest.

Hereinafter, an exemplary embodiment will be described with reference to the accompanying drawings.

FIGS. 1 to 9 show an electronic apparatus 1 according to an embodiment. The electronic apparatus 1 is, for example, a notebook PC. However, electronic apparatuses to which the embodiment can be applied are not limited thereto. The embodiment can be widely applied to various kinds of electronic apparatuses including, for example, a personal digital assistant (PDA) and a game machine.

Figure 1:
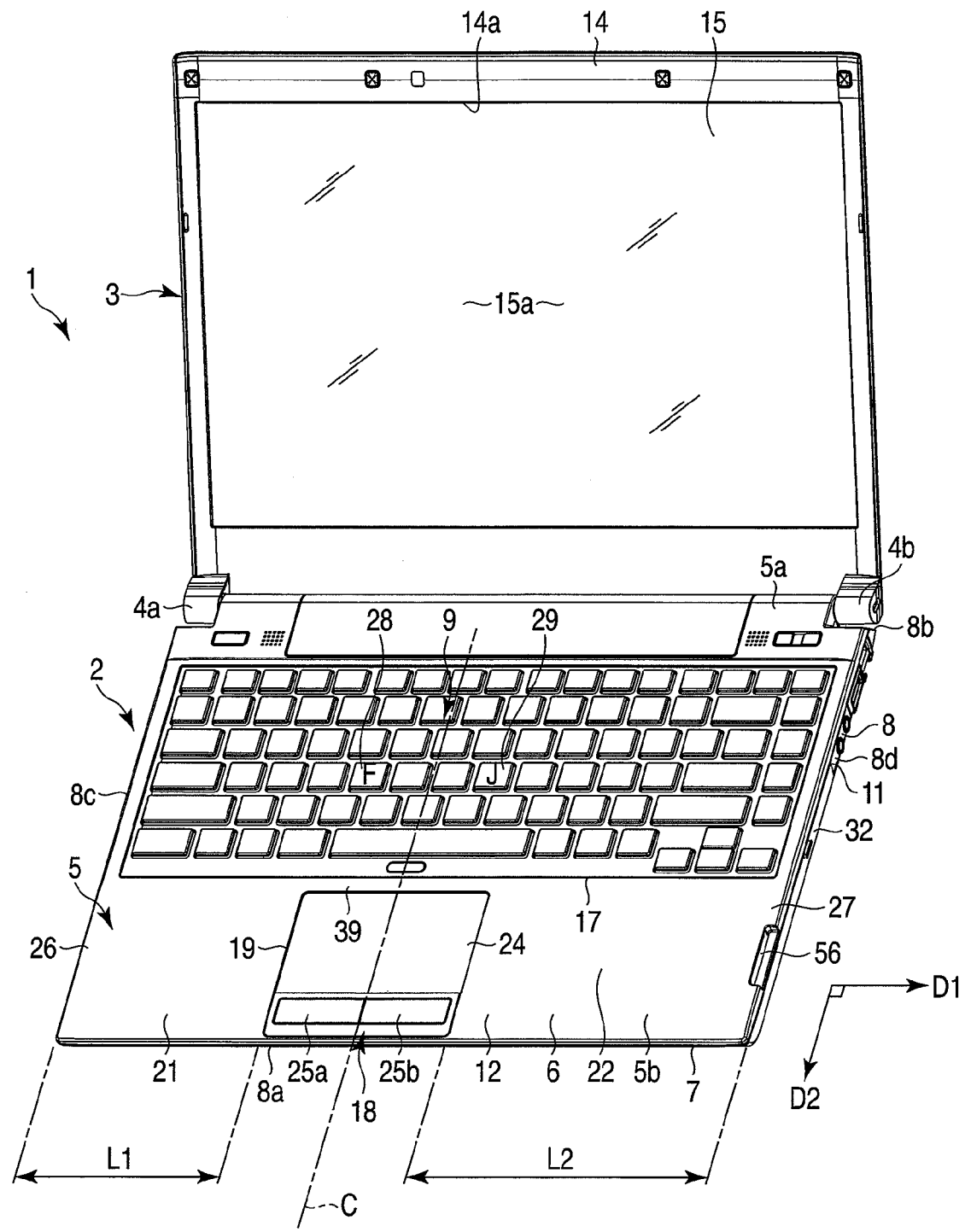
FIG. 1 is an exemplary perspective view of an example of an electronic apparatus according to an embodiment.

As shown in FIG. 1, the electronic apparatus 1 includes a main unit 2, a display unit 3, and hinges 4a and 4b. The main unit 2 is an electronic apparatus main body provided with a main board. The main unit 2 includes a housing 5. The housing 5 has a flat box shape including an upper wall 6, a lower wall 7, and a circumferential wall 8.

The lower wall 7 faces the desk surface when the electronic apparatus 1 is placed on the desk. The lower wall 7 is substantially parallel to the desk surface. The upper wall 6 is opposite to the lower wall 7 with a space therebetween and extends substantially in parallel (that is, substantially in a horizontal direction) to the lower wall 7. A keyboard 9 is provided on the upper wall 6. The circumferential wall 8 rises with respect to the lower wall 7, and connects the edge portion of the lower wall 7 and the edge portion of the upper wall 6.

The housing 5 includes a housing base 11 and a housing cover 12. The housing base 11 includes the lower wall 7 and a part of the circumferential wall 8. The housing cover 12 includes the upper wall 6 and a part of the circumferential wall 8. The housing cover 12 is combined with the housing base 11 to form the housing 5.

The housing 5 includes a rear end portion 5a to which the display unit 3 is rotatably connected and a front end portion 5b opposite to the rear end portion 5a. The circumferential wall 8 includes a front wall 8a, a rear wall 8b, a left wall 8c, and a right wall 8d. The front wall 8a extends in the width direction (left-right direction) of the housing 5 in the front end portion 5b. The rear wall 8b extends in the width direction of the housing 5 in the rear end portion 5a. The left wall 8c and the right wall 8d extend in the depth direction (front-rear direction) of the housing 5 and connect the end portions of the front wall 8a and the end portions of the rear wall 8b.

The display unit 3 is rotatably (openably) connected to the rear end portion 5a of the main unit 2 by the hinges 4a and 4b. The display unit 3 can be pivoted between a closed position where the display unit 3 falls from the upper side to cover the main unit 2 and an opened position where the display unit 3 rises with respect to the main unit 2.

As shown in FIG. 1, the display unit 3 includes a display housing 14 and a display panel 15 in the display housing 14. A display screen 15a of the display panel 15 can be exposed to the outside through an opening portion 14a in the front wall of the display housing 14.

Figure 2:
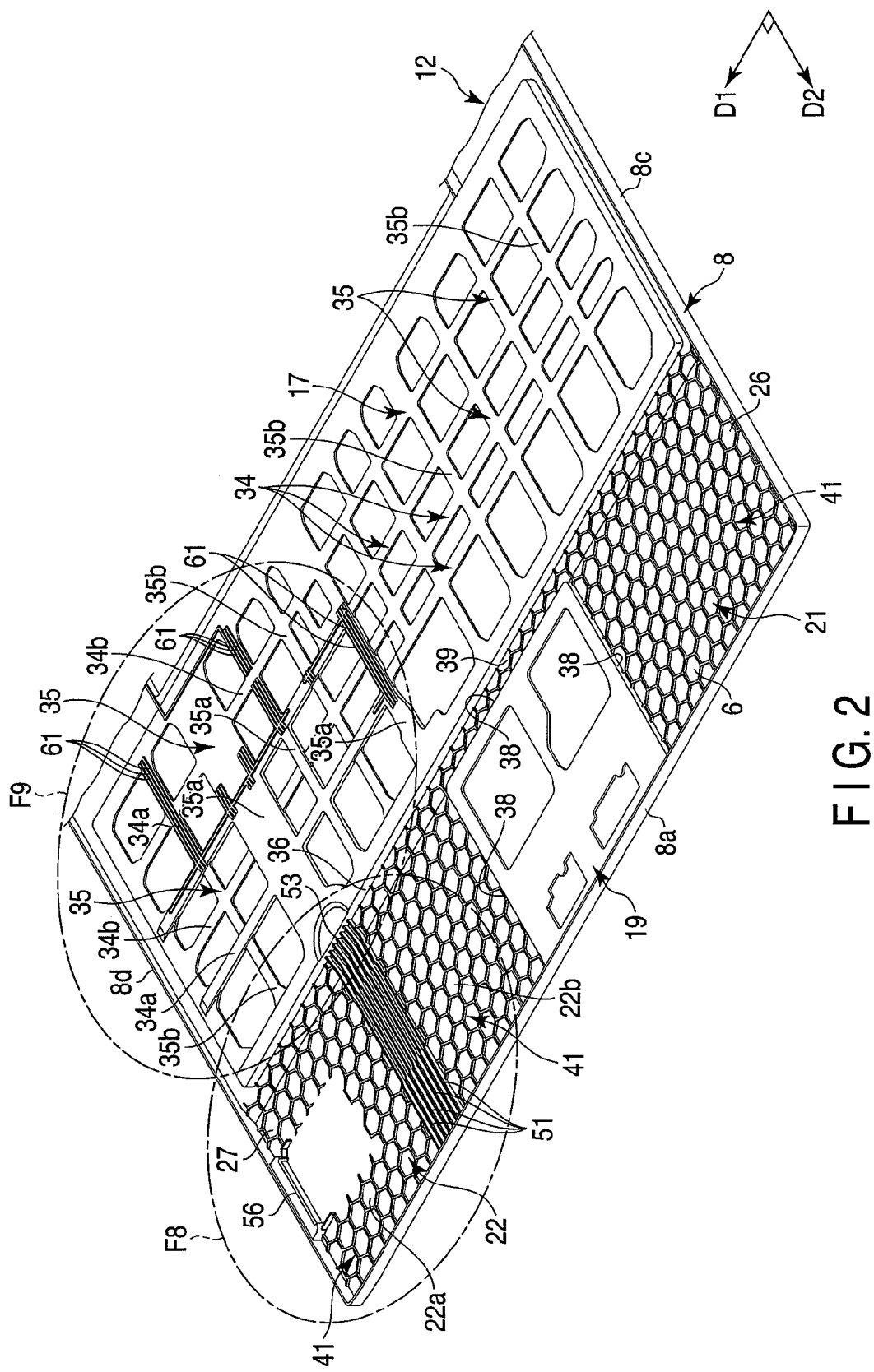
FIG. 2 is an exemplary perspective view of an example of an inner surface of a housing cover of the electronic apparatus shown in FIG. 1.
Figure 3:
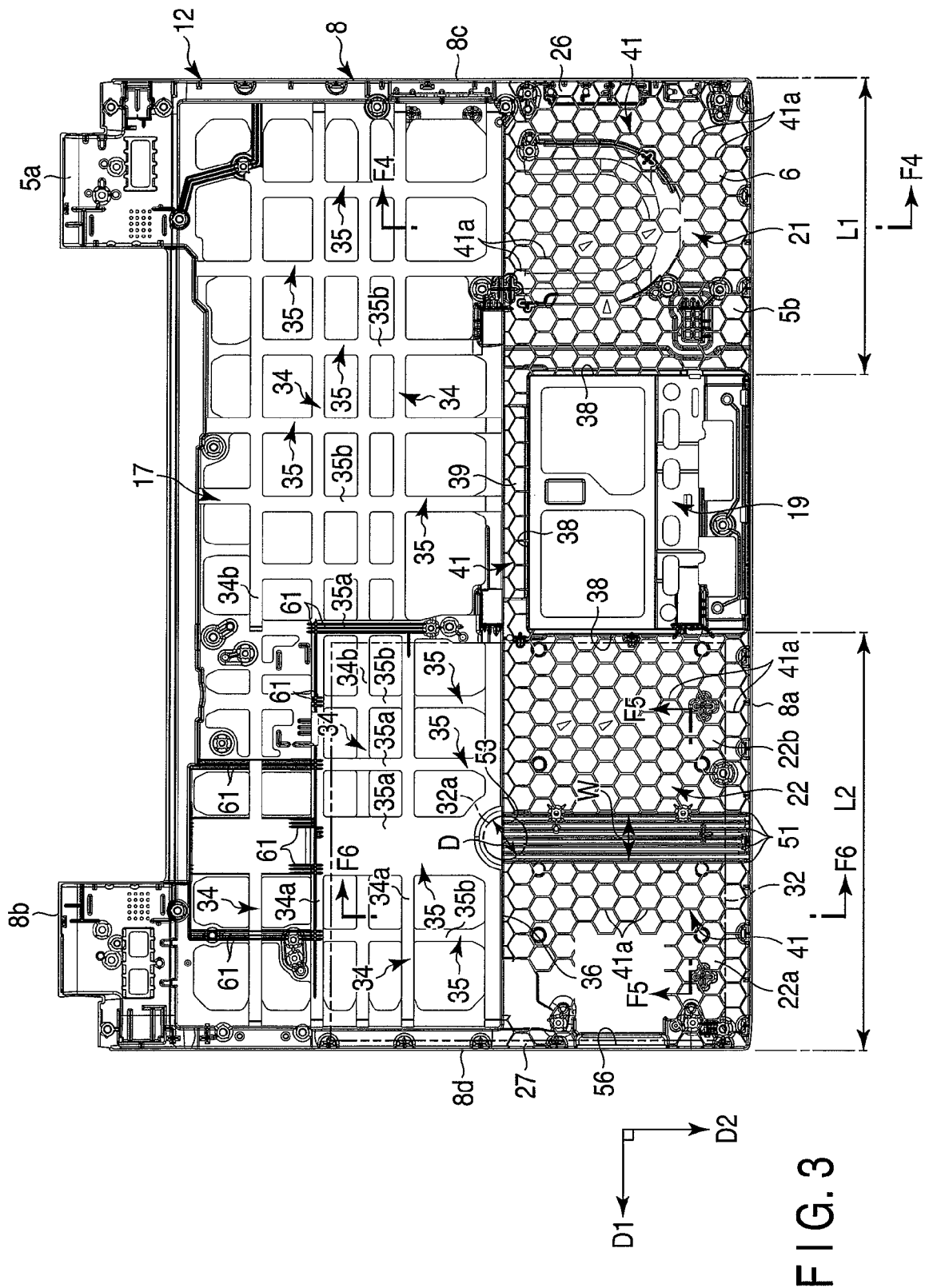
FIG. 3 is an exemplary plan view of an example of the inner surface of the housing cover of the electronic apparatus shown in FIG. 1.

As shown in FIGS. 1 to 3, the upper wall 6 includes a keyboard attachment portion 17 to which the keyboard 9 is attached, a touchpad attachment portion 19 to which a touchpad unit 18 is attached, a first palmrest 21, and a second palmrest 22. The keyboard attachment portion 17 extends substantially in parallel to the front wall 8a and the rear wall 8b in the width direction of the housing 5 between the left wall 8c and the right wall 8d.

The keyboard attachment portion 17 is recessed from the first palmrest 21 and the second palmrest 22 to the inside of the housing 5, and the keyboard 9 is mounted on the recessed portion. In this way, the height of the upper surface (for example, a key top) of the keyboard 9 attached to the keyboard attachment portion 17 is substantially equal to or slightly greater than that of the upper surface of the first palmrest 21 and the upper surface of the second palmrest 22.

The touchpad unit 18 is attached to the touchpad attachment portion 19. The touchpad unit 18 includes, for example, a touchpad 24, which is a pointing device, and a pair of buttons 25a and 25b. The touchpad attachment portion 19 is between the keyboard attachment portion 17 and the front wall 8a.

For example, substantially similar to the keyboard attachment portion 17, the touchpad attachment portion 19 is recessed from the first palmrest 21 and the second palmrest 22 toward the inside of the housing 5, and the touchpad unit 18 is mounted on the recessed portion. In this way, the height of the upper surface of the touchpad unit 18 attached to the touchpad attachment portion 19 is substantially equal to that of the upper surface of the first palmrest 21 and the upper surface of the second palmrest 22.

Instead of the above-mentioned structure, the touchpad attachment portion 19 may include an opening portion through which the touchpad unit 18 in the housing 5 is exposed, without being recessed from the first palmrest 21 or the second palmrest 22. In this case, the touchpad unit 18 is attached to the touchpad attachment portion 19 from the inside of the housing 5.

As shown in FIG. 1, the housing 5 includes a first end portion 26 and a second end portion 27 that are end portions in the longitudinal direction (the width direction) of the housing 5. The first end portion 26 includes, for example, the left wall 8c. The second end portion 27 includes, for example, the right wall 8d. A home position center C of the keyboard 9 is closer to the first end portion 26 than to the second end portion 27. The term "home position" means a position where the forefingers of the left and right hands of the user are placed on an F key 28 and a J key 29, which are reference keys, on a JIS keyboard or an ASCII keyboard. The term "home position center" means a line that runs through the center between the F key 28 and the J key 29 in the short-side direction of the keyboard 9.

The touchpad attachment portion 19 is provided so as to correspond to the home position center C of the keyboard 9. That is, a central portion of the touchpad 24 is on the extension line of the home position center C of the keyboard 9. In other words, the touchpad 24 deviates from the central portion (housing center) of the housing 5 and is closer to the first end portion 26 than to the second end portion 27.

For example, the hands of the user are placed on the first palmrest 21 and the second palmrest 22 when the user operates the keyboard 9. The first palmrest 21 and the second palmrest 22 are between the keyboard attachment portion 17 and the front wall 8a. The first palmrest 21 is provided between the first end portion 26 and the touchpad 24. The second palmrest 22 is provided between the second end portion 27 and the touchpad 24. Therefore, a length L2 of the second palmrest 22 is greater than a length L1 of the first palmrest 21 in the direction from the first palmrest 21 to the second palmrest 22.

Here, a first direction D1 and a second direction D2 are defined. The first direction D1 is from the first palmrest 21 to the second palmrest 22. The second direction D2 is from the keyboard 9 to the touchpad 24 and is substantially orthogonal to the first direction D1.

In the specification, the vertical and horizontal directions are defined based on the normal posture (the posture shown in FIG. 1) of the electronic apparatus 1. Therefore, in the description using FIG. 2 or 3 in which the electronic apparatus 1 is reversed, the expressions about the vertical and horizontal directions are also reversed.

Figure 4:
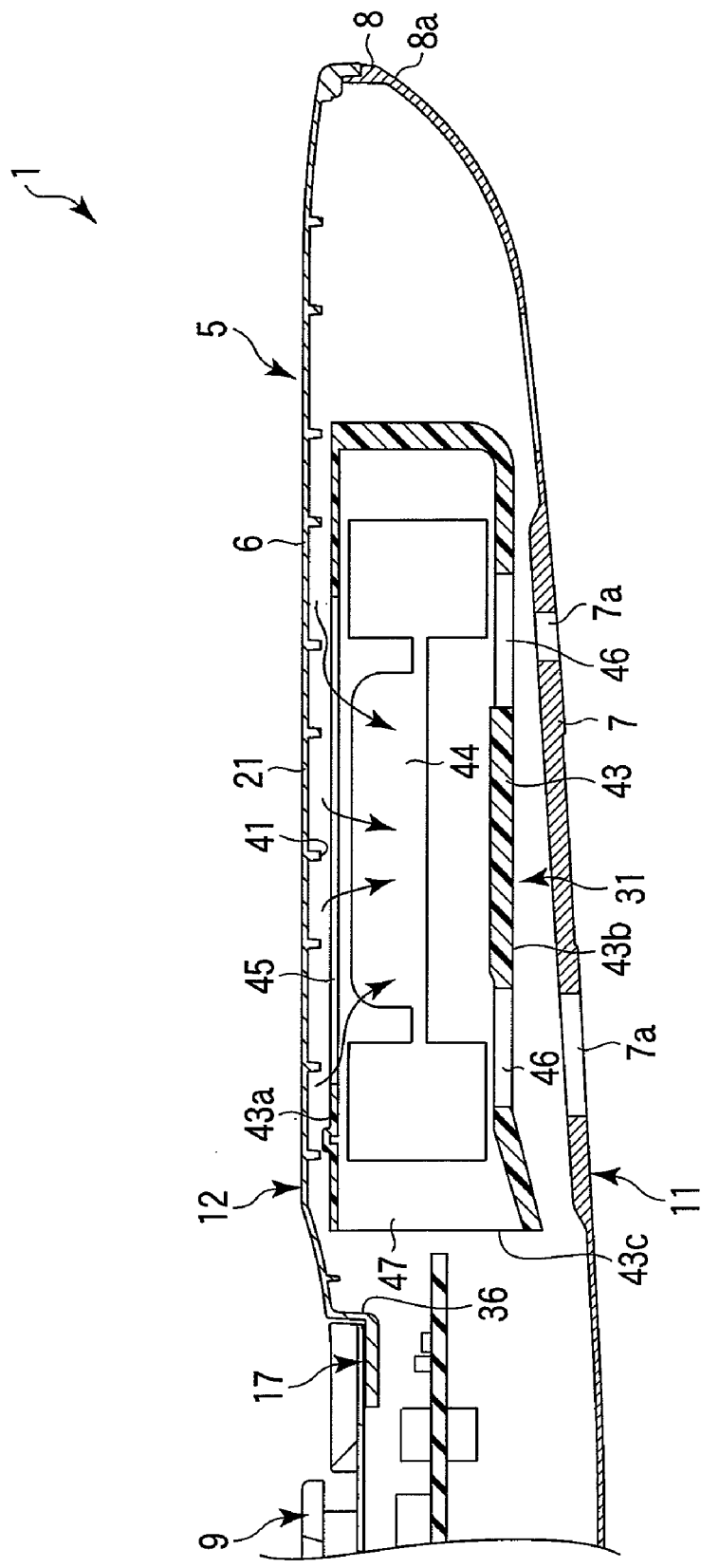
FIG. 4 is an exemplary cross-sectional view of the housing cover taken along the line F4-F4 of FIG. 3.

As shown in FIGS. 3 and 4, a cooling fan 31 and an optical disk drive (ODD) unit 32 are contained in the housing 5. The ODD unit 32 is an example of a unit (functional unit). The "unit" may be a storage device, such as a hard disk drive (HDD) or other units. A spindle portion 32a is provided in a substantially central portion of the ODD unit 32. The spindle portion 32a is one of the portions that are weakest against external force or impact in the ODD unit 32.

As shown in FIGS. 2 and 3, the keyboard attachment portion 17 is, for example, plate-like frame structure that includes a plurality of rectangular holes. That is, the keyboard attachment portion 17 includes a plurality of first beams 34 extending in the first direction D1 and a plurality of second beams 35 extending in the second direction D2. The first beams 34 and the second beams 35 are connected to form a lattice.

As described above, the keyboard attachment portion 17 is recessed from the first palmrest 21 and the second palmrest 22 to the inside of the housing 5. As shown in FIGS. 2 and 3, the keyboard attachment portion 17 includes a rising wall 36 (first rising wall) that rises in the housing 5 to make the keyboard attachment portion 17 recessed. The rising wall 36 forms the edge portion of the keyboard attachment portion 17.

The rising wall 36 extends in the first direction D1 over the entire length of the keyboard attachment portion 17 in the longitudinal direction of the keyboard attachment portion. The rising wall 36 serves as a beam which extends in the first direction D1 and reinforces the upper wall 6. The rising wall 36 is directly above the spindle portion 32a of the ODD unit 32 and faces the spindle portion 32a.

The front wall 8a of the housing 5 extends in the first direction D1 over the substantially entire width of the housing 5. The front wall 8a is bent and rises with respect to the upper wall 6. The front wall 8a serves as a beam which extends in the first direction D1 and reinforces the upper wall 6.

As described above, the touchpad attachment portion 19 is recessed from the first palmrest 21 and the second palmrest 22 to the inside of the housing 5. As shown in FIGS. 2 and 3, the touchpad attachment portion 19 includes rising walls 38 (second rising walls) that rise in the housing 5 to make the touchpad attachment portion 19 recessed. The rising walls 38 form the edge portion of the touchpad attachment portion 19. Some of the rising walls 38 extend in the second direction D2. The rising walls 38 serve as beams which extend in the second direction D2 and reinforce the upper wall 6.

As shown in FIGS. 2 and 3, a honeycomb-shaped rib 41 is provided on the inner surface of the first palmrest 21, the inner surface of the second palmrest 22, and the inner surface of a region 39 (hereinafter, referred to as an intermediate region 39) between the touchpad attachment portion 19 and the keyboard attachment portion 17. The honeycomb-shaped rib 41 is an example of a first rib. The honeycomb-shaped rib 41 is provided integrally with the upper wall 6. The honeycomb-shaped rib 41 protrudes from the inner surface of the housing 5 to the inside of the housing 5 and is, for example, an aggregate of regular hexagonal cells. That is, the regular hexagonal cells are arranged without any gap therebetween.

As shown in FIGS. 2 and 3, the honeycomb-shaped rib 41 is uniformly provided in the first palmrest 21, the second palmrest 22, and the intermediate region 39. That is, the honeycomb-shaped rib 41 is continuously provided in the entire region between the keyboard attachment portion 17 and the front wall 8a in the first palmrest 21 and the second palmrest 22. For example, the honeycomb-shaped rib 41 is connected to the rising wall 36 of the keyboard attachment portion 17, the rising wall 38 of the touchpad attachment portion 19, the front wall 8a, the left wall 8c, and the right wall 8d while maintaining its height.

The housing cover 12 is formed by, for example, metal, for example, magnesium alloy die-casting. In this case, molten metal flows from the rear wall 8b of the housing cover 12 to the front wall 8a. That is, the molten metal flows along the second direction D2.

As shown in FIG. 3, each of the regular hexagonal cells includes ribs 41a extending in the second direction D2. That is, in the honeycomb-shaped rib 41, two sides of each regular hexagonal cell are aligned along the direction in which the molten metal flows. In this way, it is easy for the molten metal to flow, and the castability of the housing cover 12 improves. The housing cover 12 may be made of, for example, synthetic resin.

As shown in FIG. 4, the inner surface of the first palmrest 21 faces the cooling fan 31. The cooling fan 31 is, for example, a double suction type. That is, the cooling fan 31 includes a fan case 43 and an impeller 44 that rotates in the fan case 43. The fan case 43 includes an upper surface 43a, a lower surface 43b, and a circumferential surface 43c.

A first intake 45 is provided in the upper surface 43a. The first intake 45 faces the first palmrest 21. A second intake 46 is provided in the lower surface 43b. The second intake 46 is opposite to the first intake 45 and faces, for example, inlets 7a of the lower wall 7. A discharge hole 47 is provided in the circumferential surface 43c. The cooling fan 31 is away from the upper wall 6 in order to draw air even from the first intake 45. The honeycomb-shaped rib 41 is provided using the gap between the upper wall 6 and the cooling fan 31.

As shown in FIGS. 2 and 3, for example, a plurality of straight ribs 51 (first straight ribs) is provided on the inner surface of the second palmrest 22. The straight rib 51 is an example of a second rib. The straight ribs 51 extend in the second direction D2 between the keyboard attachment portion 17 and the front wall 8a. That is, the straight ribs 51 extend so as to be substantially orthogonal to the rising wall 36 of the keyboard attachment portion 17 and the front wall 8a of the housing 5.

Figure 6:
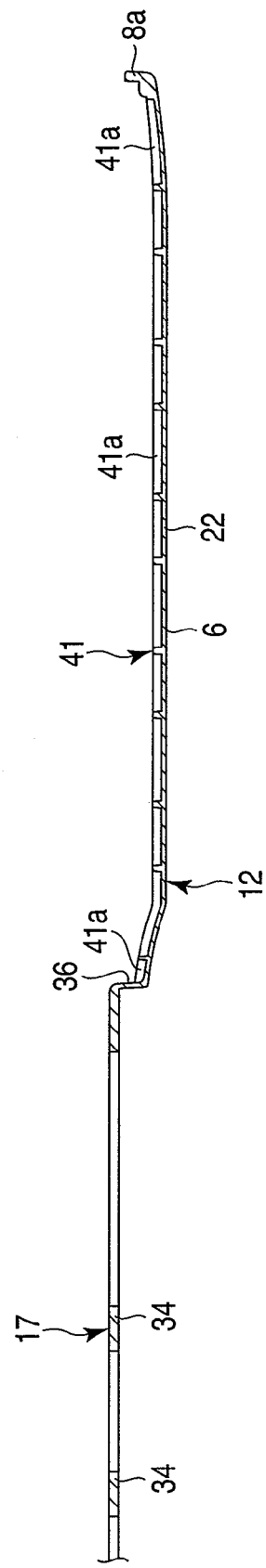
FIG. 6 is an exemplary cross-sectional view of the housing cover taken along the line F6-F6 of FIG. 3.

As shown in FIG. 6, for example, each straight rib 51 is connected to the rising wall 36 of the keyboard attachment portion 17 and the front wall 8a while maintaining its height. In this way, as shown in FIG. 3, an H-shaped beam portion including the rising wall 36 of the keyboard attachment portion 17, the straight ribs 51, and the front wall 8a is in the second palmrest 22. In other words, the straight ribs 51 connecting the rising wall 36 of the keyboard attachment portion 17 and the front wall 8a, which serve as beams, are provided therebetween.

Figure 7:
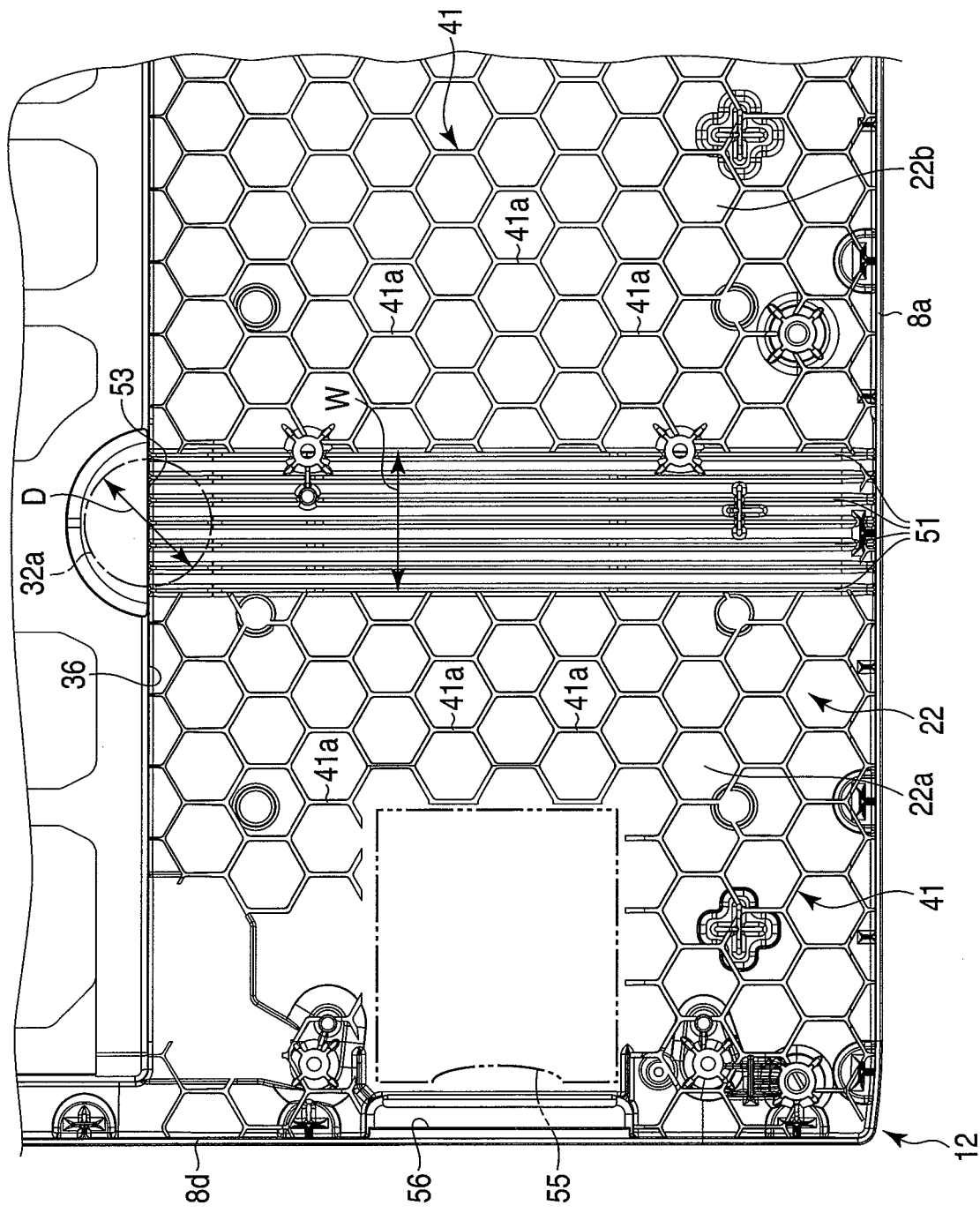
FIG. 7 is an exemplary plan view of an example of a second palmrest of the housing cover shown in FIG. 3.

As shown in FIG. 7, the plurality of straight ribs 51 is collectively provided in the central portion of the second palmrest 22. Therefore, the second palmrest 22 is divided into a first region 22a between the right wall 8d of the housing 5 and the straight ribs 51 and a second region 22b between the touchpad attachment portion 19 and the straight ribs 51 by the straight ribs 51. As shown in FIG. 3, the first region 22a and the second region 22b have substantially the same area. The area of each of the first region 22a and the second region 22b is close to that of the first palmrest 21.

The honeycomb-shaped rib 41 is provided in the entire first region 22a and the entire second region 22b. The honeycomb-shaped rib 41 is provided not between the plurality of straight ribs 51. However, the honeycomb-shaped rib 41 may be provided between the plurality of straight ribs 51.

Figure 5:
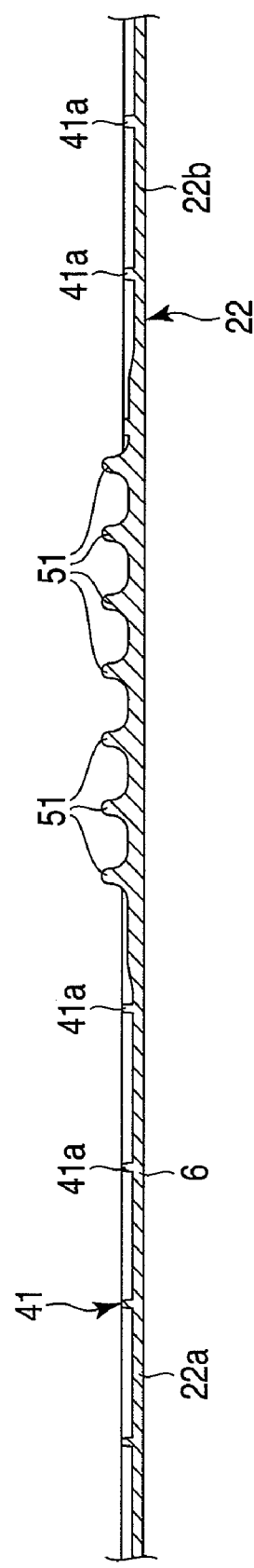
FIG. 5 is an exemplary cross-sectional view of the housing cover taken along the line F5-F5 of FIG. 3.

As shown in FIG. 5, for example, the height of the straight rib 51 is greater than that of the honeycomb-shaped rib 41. The height of the straight rib 51 may be substantially equal to or less than that of the honeycomb-shaped rib 41. For example, the honeycomb-shaped rib 41 is connected to the side surface of the straight rib 51 while maintaining its height.

Figure 8:
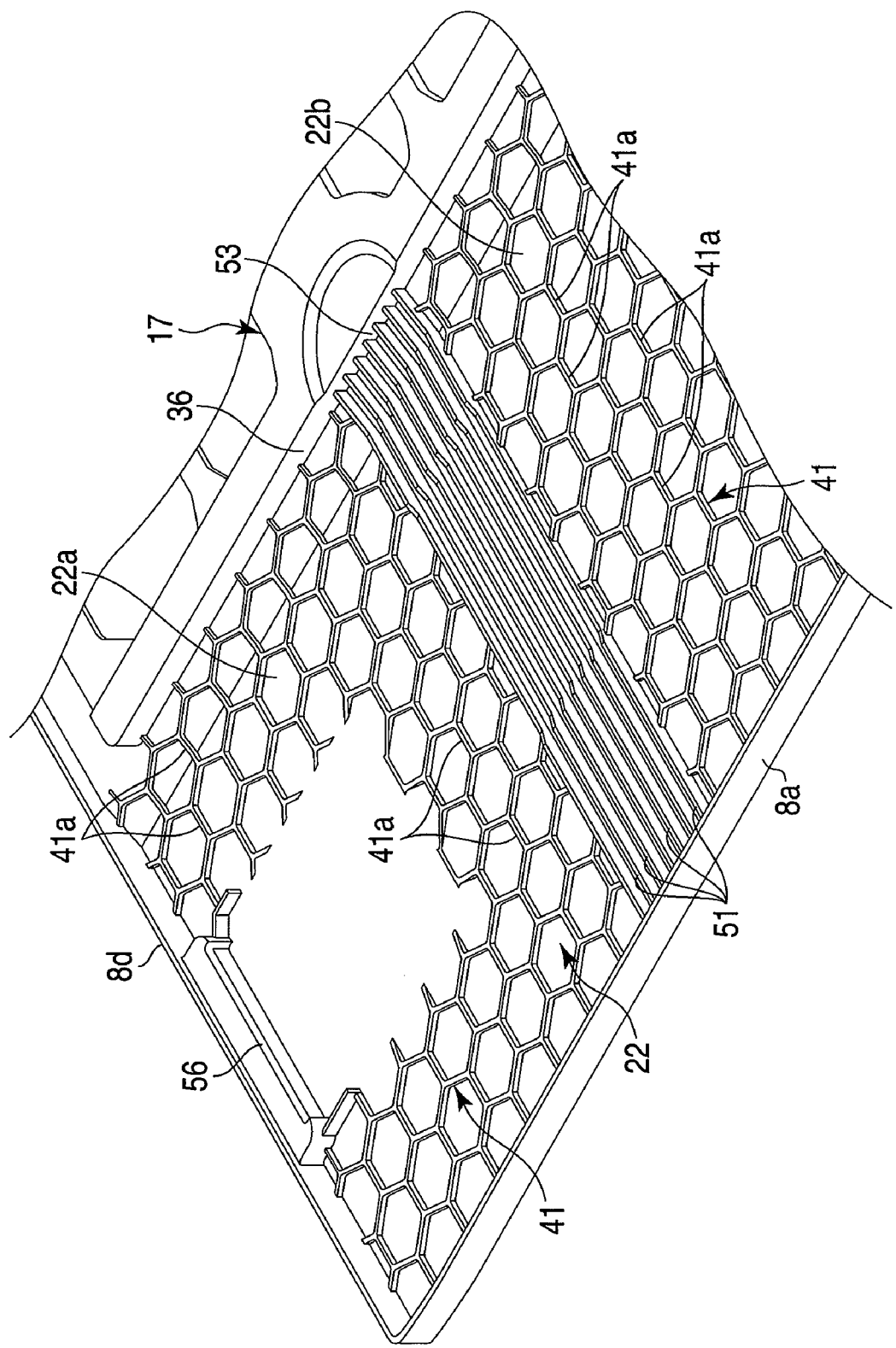
FIG. 8 is an exemplary perspective view illustrating a region surrounded by the line F8 in the housing cover shown in FIG. 2.

As shown in FIG. 8, the height of the central portion of the straight rib 51 is small such that, for example, a flexible cable (not shown) passes through. As shown in FIG. 6, the height of the straight rib 51 is smaller than that of the rising wall 36 of the keyboard attachment portion 17. The height of the straight rib 51 may be substantially equal to or greater than that of the rising wall 36.

As shown in FIGS. 3 and 7, the straight ribs 51 are directly above the spindle portion 32a of the ODD unit 32 and face the spindle portion 32a. A width W of the set of the plurality of straight ribs 51 is substantially equal to a diameter D of the spindle portion 32a. A connection portion 53 between the straight ribs 51 and the rising wall 36 is directly above the spindle portion 32a and faces the spindle portion 32a.

Figure 9:
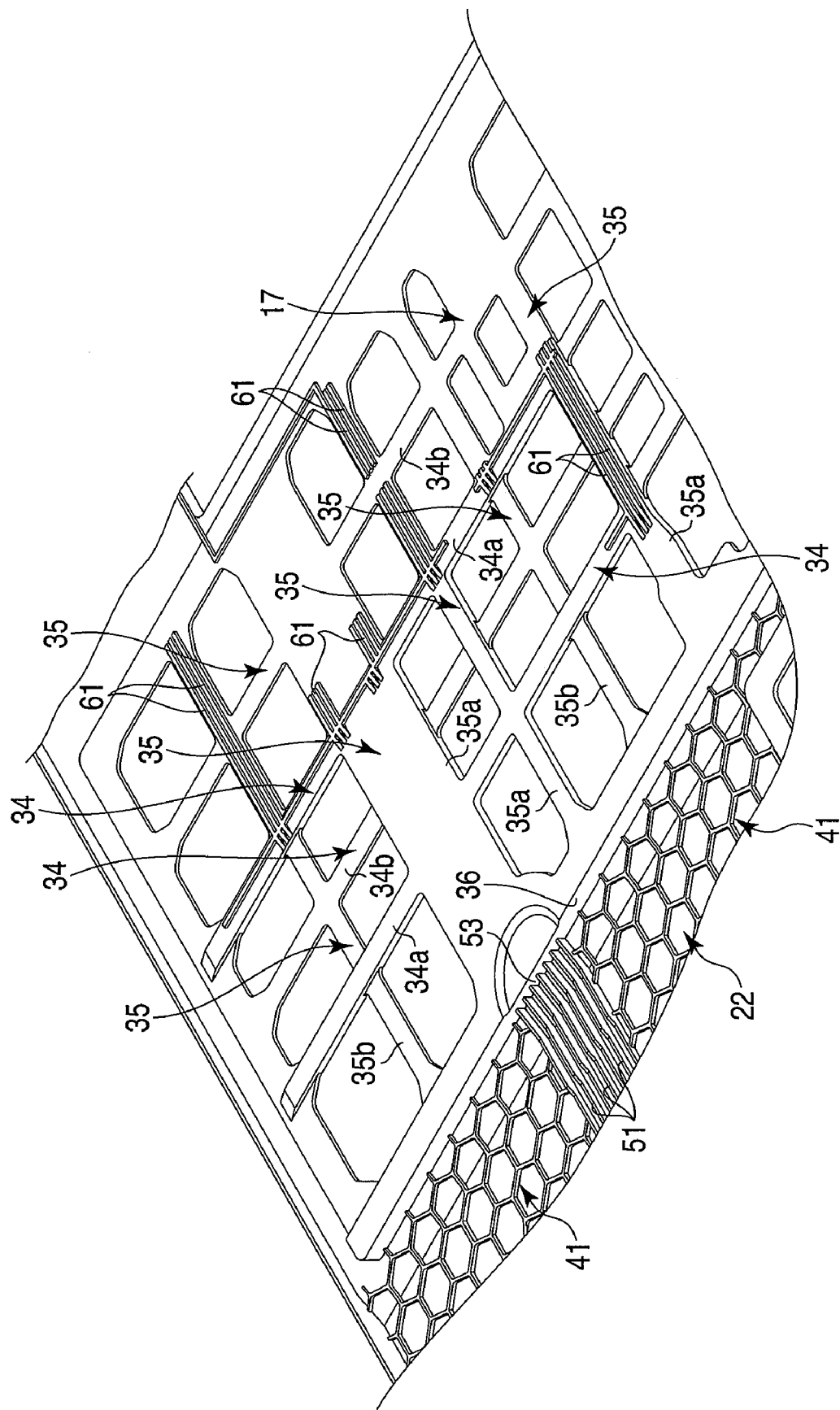
FIG. 9 is an exemplary perspective view illustrating a region surrounded by the line F9 in the housing cover shown in FIG. 2.

As shown in FIGS. 3 and 9, one first beam 34a closest to the spindle portion 32a of the ODD unit 32 and one first beam 34a along the outline of the ODD unit 32 among the first beams 34 of the keyboard attachment portion 17 are thicker than the other first beams 34b.

In addition, two second beams 35a closest to the spindle portion 32a of the ODD unit 32 and one second beam 35a along the outline of the ODD unit 32 among the second beams 35 of the keyboard attachment portion 17 are thicker than the other second beams 35b. One second beam 35a is on the extension line of the straight rib 51. That is, a cross-shaped beam portion facing the spindle portion 32a of the ODD unit 32 is provided by the straight ribs 51, the second beams 35a, and the rising wall 36 of the keyboard attachment portion 17. In this way, the periphery of the spindle portion 32a of the ODD unit 32 and the periphery of the outline of the ODD unit 32 are reinforced.

As shown in FIG. 9, straight ribs 61 (second straight ribs) are provided on some of the second beams 35. The straight ribs 61 extend substantially in the same direction (second direction D2) as that in which the straight ribs 51 extend.

As shown in FIG. 7, a card slot 55 is contained in the housing 5. The card slot 55 is, for example, an SD card slot, but may be a slot for other types of cards. The card slot 55 faces the inner surface of the second palmrest 22. The card slot 55 faces an opening portion 56 formed in the circumferential wall 8 of the housing. A card is inserted into or removed from the card slot 55 through the opening portion 56. For example, the honeycomb-shaped rib 41 is along the outline of the card slot 55 so as to avoid the card slot 55. In this way, the card slot 55 may be in close contact with the upper wall 6 or may be on the upper wall 6 with a small gap therebetween.

According to this structure, it is possible to reduce the thickness of the housing 5 and maintain or improve the rigidity of the housing 5. That is, in this embodiment, the honeycomb-shaped rib 41 is on the inner surfaces of the palmrests 21 and 22. Therefore, even when the thickness of the housing 5 is reduced, since the rigidity of the palmrests 21 and 22 that most frequently receive force from the user among parts of the housing 5 is enhanced and the user can use the electronic apparatus 1 without feeling a sense of incongruity. In other words, the honeycomb-shaped rib 41 on the inner surfaces of the palmrests 21 and 22 allows reduction in the thickness of the housing 5.

The second palmrest 22 is longer than the first palmrest 21, and the rigidity of the second palmrest 22 is lower than that of the first palmrest 21. In this embodiment, the straight ribs 51 are provided on the second palmrest 22. In this way, the rigidity of the second palmrest 22 with a relatively large length is improved, and the rigidity of the second palmrest 22 is close to that of the first palmrest 21. Therefore, it is possible to improve the overall rigidity of the upper wall 6 on which the touchpad 24 is arranged so as to deviate from the center of the upper wall 6.

The honeycomb-shaped rib 41 mainly improves torsional rigidity and the straight ribs 51 mainly improve bending rigidity (against deformation in the pressing direction). As such, a combination of different kinds of ribs makes it possible to improve rigidity against various kinds of external force, such as torsion and bending.

Since the straight ribs 51 are provided so as to be substantially orthogonal to the front wall 8a, the straight ribs 51 and the front wall 8a can form a T-shaped beam portion. In this way, the periphery of the second palmrest 22 is largely reinforced, as compared with the structure in which only the front wall 8a forms an I-shaped beam portion.

For example, the honeycomb-shaped rib 41 is formed by pouring molten metal into a groove of a mold corresponding to the shape of the honeycomb-shaped rib 41. The groove of the mold corresponding to the shape of the honeycomb-shaped rib 41 rises perpendicularly to the flow direction of the molten metal. Therefore, the castability of the housing cover 12 including the honeycomb-shaped rib 41 thereon is likely to be lower than that of the housing cover in which the honeycomb-shaped rib 41 is not provided.

However, in this embodiment, the straight ribs 51 are provided to extend in the flow direction of the molten metal. That is, a portion of the molten metal can flow through the straight ribs 51 and fluidity in the mold improves. In other words, the straight ribs 51 also serve as fluidity support ribs. That is, the straight ribs 51 make it possible to ensure relatively high castability in the housing cover 12 including the honeycomb-shaped rib 41 thereon.

In this embodiment, the keyboard attachment portion 17 includes the rising wall 36 extending in the first direction D1, and the straight ribs 51 extend in a direction substantially orthogonal to the rising wall 36. That is, the rising wall 36 and the straight ribs 51 function as beams in two directions that are substantially orthogonal to each other. In this way, the rigidity of the second palmrest 22 is further improved.

In this embodiment, the straight ribs 51 are connected to the rising wall 36 of the keyboard attachment portion 17. Therefore, a T-shaped beam portion is formed around the second palmrest 22. When the front wall 8a is added, an H-shaped beam portion is formed around the second palmrest 22. In this way, the rigidity of the second palmrest 22 is improved.

In this embodiment, the honeycomb-shaped rib 41 is in the H-shaped beam portion formed by the rising wall 36 of the keyboard attachment portion 17, the straight ribs 51, and the front wall 8a, that is, a region surrounded by the rising wall 36, the straight ribs 51, and the front wall 8a in three directions. Therefore, the rising wall 36, the straight ribs 51, and the front wall 8a are not only directly connected to each other, but also connected to each other via the honeycomb-shaped rib 41. In this way, the rigidity of the upper wall 6 is further improved.

In other words, as shown in FIG. 3, the honeycomb-shaped rib 41 is in a region surrounded by the rising wall 36 of the keyboard attachment portion 17, the straight ribs 51, the front wall 8a, and the rising wall 38 of the touchpad attachment portion 19 in four directions. In this way, the rising wall 36 of the keyboard attachment portion 17, the straight ribs 51, the front wall 8a, and the rising wall 38 of the touchpad attachment portion 19 serving as beams are connected to each other by the honeycomb-shaped rib 41. In other words, the rising wall 36 of the keyboard attachment portion 17, the straight ribs 51, the front wall 8a, and the rising wall 38 of the touchpad attachment portion 19 form a planar beam portion.

In this embodiment, the straight ribs 51 face the spindle portion 32a of the ODD unit 32. Therefore, the second palmrest 22 is less likely to be bent in the region facing the spindle portion 32a of the ODD unit 32. As a result, it is possible to suppress external force from being applied to the relatively weak spindle portion 32a and thus improve the reliability of the electronic apparatus 1.

In this embodiment, the rising wall 36 of the keyboard attachment portion 17 faces the spindle portion 32a of the ODD unit 32. Therefore, the second palmrest 22 is less likely to be bent in the region facing the spindle portion 32a of the ODD unit 32. As a result, it is possible to suppress external force from being applied to the spindle portion 32a and thus improve the reliability of the electronic apparatus 1.

In this embodiment, the connection portion 53 between the straight ribs 51 and the rising wall 36 of the keyboard attachment portion 17 faces the spindle portion 32a of the ODD unit 32. That is, the connection portion between two components serving as beams corresponds to the spindle portion 32a of the ODD unit 32. Therefore, the second palmrest 22 is less likely to be bent in the region facing the spindle portion 32a of the ODD unit 32.

In this embodiment, the honeycomb-shaped rib 41 is provided so as to avoid the card slot 55. In this embodiment, the straight ribs 51 are provided on the second palmrest 22. Therefore, even when the honeycomb-shaped rib 41 in a portion of the second palmrest 22 is omitted, it is possible to sufficiently improve the overall rigidity.

In this embodiment, the keyboard attachment portion 17 includes straight ribs 61 extending substantially in the same direction as the straight ribs 51. Therefore, the rigidity of the keyboard attachment portion 17 is improved. In addition, the straight ribs 61 of the keyboard attachment portion 17 serve as fluidity support ribs for the straight ribs 51 of the second palmrest 22.

The embodiment is not limited to the above-described embodiment, but the components of the above-described embodiment may be changed without departing from the scope and spirit of the invention. In addition, a plurality of components according to the above-described embodiment may be appropriately combined with each other to form various structures. For example, some of the components according to the above-described embodiment may be removed. Components according to different embodiments may be appropriately combined with each other.

For example, the honeycomb-shaped rib 41 may also be in the region facing the card slot 55. The straight ribs 51 or the rising wall 36 of the keyboard attachment portion 17 may not necessarily face the spindle portion 32a of the ODD unit 32. The straight ribs 51 may not be connected to the rising wall 36 of the keyboard attachment portion 17. The straight ribs 51 may extend in the second direction D2.

In this embodiment, the honeycomb-shaped rib, which is an aggregate of hexagonal cells, is provided as the first rib on the inner surface of the first palmrest 21 and the inner surface of the second palmrest 22. Instead of this structure, for example, ribs having a pentagonal shape or other polygonal shapes may be formed in a lattice as the first rib.

In this embodiment, the straight ribs are provided as the second ribs on the inner surface of the second palmrest 22. Instead of this structure, for example, ribs may be provided as the second ribs in an arc shape, a wave shape, or other shapes that extend by a predetermined distance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
    a housing comprising a first end, a second end, and a keyboard attachment, the keyboard attachment comprising a region closer to the second end than to the first end;
    a touchpad closer to the first end than to the second end;
    a first palmrest between the first end and the touchpad;
    a second palmrest between the second end and the touchpad;
    a honeycomb-shaped rib on inner surfaces of the first palmrest and the second palmrest; and
    straight ribs respectively on the inner surface of the second palmrest and the region of the keyboard attachment.

2. The electronic apparatus of claim 1, wherein the straight ribs extends along a first axis substantially orthogonal to a second axis, wherein the second axis extends through the first palmrest and the second palmrest.

3. The electronic apparatus of claim 2, wherein the keyboard attachment is recessed into the housing, the keyboard attachment comprising a rising wall in the housing, wherein the rising wall extends along the second axis.

4. The electronic apparatus of claim 3, wherein a portion of the straight ribs is connected to the rising wall.

5. The electronic apparatus of claim 4, further comprising a unit comprising a spindle in the housing, wherein the portion of the straight ribs faces the spindle.

6. The electronic apparatus of claim 5, wherein the rising wall faces the spindle.

7. The electronic apparatus of claim 6, further comprising a a connection portion between the portion of the straight ribs and the rising wall, wherein the connection portion faces the spindle.

8. The electronic apparatus of claim 1, further comprising a cooling fan facing the inner surface of the first palmrest.

9. The electronic apparatus of claim 1, wherein the housing further includes a card slot facing the inner surface of the second palmrest, and wherein the honeycomb-shaped rib is positioned such that it does not substantially block the card slot.

10. An electronic apparatus comprising:
    a housing comprising a palmrest, a keyboard attachment, and a touchpad;
    a honeycomb-shaped rib on an inner surface of the palmrest; and
    a straight rib on a region of the keyboard attachment which is on an opposite side of the touchpad with respect to a center of the housing.

11. The electronic apparatus of claim 10, wherein the honeycomb-shaped rib protrudes from an inner surface of the housing to an inside of the housing and comprises a plurality of hexagonal cells.

12. The electronic apparatus of claim 10, wherein the straight rib extends along an axis, and
    the hexagonal cells comprise a rib extending along the axis.

13. The electronic apparatus of claim 10, wherein the keyboard attachment comprises a plurality of first beams extending along a first axis and a plurality of second beams extending along a second axis, the first beams and the second beams connected in order to form a lattice.

14. The electronic apparatus of claim 10, wherein the housing comprises a front wall, and
    the straight rib extends in a short-side direction of the housing and between the keyboard attachment and the front wall of the housing.

15. The electronic apparatus of claim 10, wherein the housing comprises a front wall, and
    the straight rib extends substantially orthogonal to a rising wall of the keyboard attachment and the front wall of the housing.

16. The electronic apparatus of claim 10, wherein the housing comprises a front wall, and
    the straight rib is connected to a rising wall of the keyboard attachment and the front wall, respectively, at a certain protruding height.

17. The electronic apparatus of claim 10, wherein a portion of the protruding height of the straight rib is small in order for a flexible cable to pass through.

18. The electronic apparatus of claim 10, wherein the straight rib is on a region of the keyboard attachment on an opposite side of a keyboard home position.

19. The electronic apparatus of claim 10,
    wherein the palmrest is a front wall and the housing further comprises a region between the front wall and the keyboard attachment; and
    wherein the honeycomb-shaped rib on an inner surface of the region.

* * * * *